Sept. 6, 1927.

B. W. JONES 1,641,762

SUMMATION METERING SYSTEM

Filed Feb. 17, 1927

Inventor:
Benjamin W. Jones,
by
His Attorney.

Patented Sept. 6, 1927.

1,641,762

UNITED STATES PATENT OFFICE.

BENJAMIN W. JONES, OF SCHENECTADY, NEW YORK, ASSIGNOR TO GENERAL ELECTRIC COMPANY, A CORPORATION OF NEW YORK.

SUMMATION METERING SYSTEM.

Application filed February 17, 1927. Serial No. 169,051.

My invention relates to a system and apparatus for obtaining electrical measurements. The invention is applicable to a wide variety of uses but is particularly useful for obtaining a measurement proportional to the sum of the power outputs of a plurality of electric power stations or feeders located at the same or different points by means of simple and inexpensive apparatus. In carrying my invention into effect I employ one or more electron discharge devices of the three-electrode type with current measuring means in series therewith. To obtain a power summation measurement I prefer to bias the grid of the electron discharge device with a summation voltage proportional to the sum of the current outputs of the several stations and impress a voltage proportional to the circuit voltage at the stations between the filament and plate of the device. By proper calibration of the apparatus the plate current will then be proportional to the sum of the power outputs at the several stations. This scheme has the distinguishing feature that it is unnecessary to transmit any measurement current or currents between the several stations and the grid of the electron discharge device at the summation meter, and as a consequence errors due to changes in line resistance of the metering circuits between stations are largely eliminated.

The features of my invention which are believed to be novel and patentable will be pointed out in the claims appended hereto. For a better understanding of the invention reference is made in the following description to the accompanying drawing in which Fig. 1 represents an embodiment of the invention suitable for use with single phase or balanced polyphase power systems, and Fig. 2 represents an embodiment suitable for use with unbalanced polyphase power systems.

Figure 1:
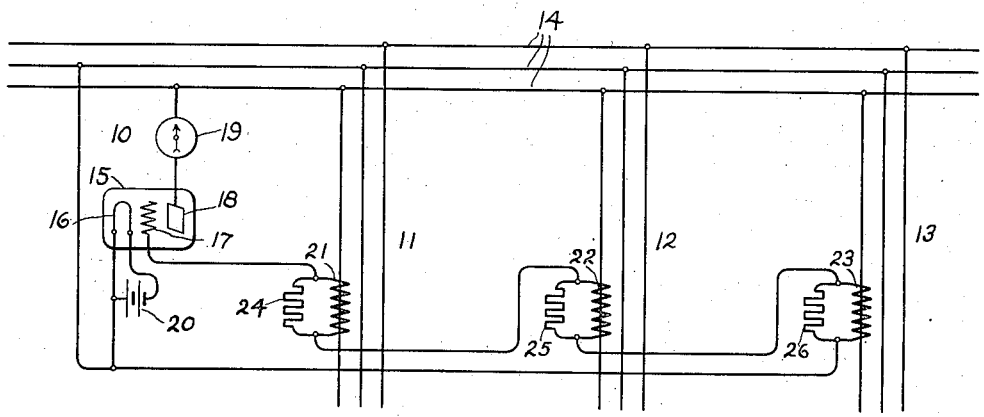
Figure 2:
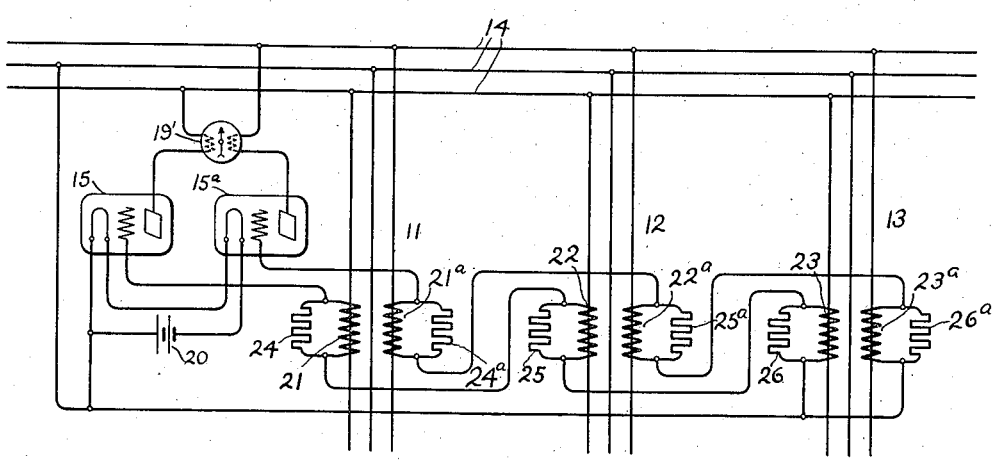

Referring to Fig. 1, 10 represents a station at which it is desired to obtain a measurement indicative of the sum of the power outputs of feeder stations 11, 12 and 13. In this simple embodiment the feeders at stations 11, 12 and 13 are all supplied by or are connected to a common distribution system indicated at 14 and thus the power is supplied at the same or approximately proportional voltages at each station.

Station 10 may be a load despatcher's office located any distance from the other stations. It is here assumed that the voltage and current of the three-phase alternating current distribution system represented will be balanced such that the current in any one phase and the voltage across any phase will be representative of the current and voltage of all phases. At station 10 is an ordinary three-electrode electron discharge device 15 having a hot cathode 16, a grid 17, and a plate 18. The filament and grid are connected across one phase of the system 14 and a direct current instrument 19 is included in the plate circuit. 20 indicates a battery for heating the filament.

At stations 11, 12 and 13, current transformers 21, 22 and 23 are included in the same phase of the three polyphase feeder circuits and the secondaries of these transformers are short circuited by suitable impedances 24, 25 and 26, such that the voltages across the secondaries of the transformers will be equally proportional to the primary current, taking into consideration differences in the transformer ratios, if any. The secondaries of the three current transformers are connected in series in the same direction so that the secondary voltages will be added and this series circuit is connected between the filament and grid of the electron discharge device 15. As a result the grid voltage will be proportional to the sum of the inphase currents in the power feeders at stations 11, 12 and 13. The current transformers are in the same phase across which the voltage connection is made so that the voltages impressed upon the grid and plate of the electron discharge device will be in phase under unity power factor conditions of the circuit.

By proper adjustment of the electron discharge device the plate current can be made approximately proportional to in-phase components of the grid bias voltage and the voltage between filament and grid, or proportional to the sum of the power of the stations 11, 12 and 13, over a considerable range of grid bias voltage. The plate voltage will not vary materially except under very unusual conditions since, as is known, the line voltage of distribution systems remains approximately constant. Some current may flow in the plate circuit with no voltage on the grid but with line voltage across the tube. The indication of the meter 19 under this condition will be marked zero.

Voltage is then applied to the grid and the meter 19 calibrated in watts corresponding to the sum of the power outputs at stations 11, 12 and 13. If this calibration is made under the average line voltage conditions over the whole range of load, the meter will be approximately accurate for the usual variations in line voltage.

Fig. 2 shows an arrangement where it is assumed that current and voltage of the outside phases as represented will be more or less unbalanced. With the exception of the direct current meter 19' the metering arrangement may be considered as two systems similar to that shown in Fig. 1, the corresponding additional parts being represented by similar reference characters followed by the letter $a$. The direct current meter 19' has two independent coils which act together in the same way as a single coil of any usual type of direct current instrument to produce accumulative measuring effects. This instrument is calibrated to give the sum of the power outputs at the three stations 11, 12 and 13. It is evident that the duplicate parts of Fig. 2 might be associated with entirely independent power systems to obtain a power summation measurement. Similarly, we could provide the remaining circuit of the three-phase system with similar summation equipment.

If for any reason it was desirable to obtain a reading at 19' proportional to the sum of the power outputs of stations 11 and 12 less that at station 13, it could be accomplished by merely reversing the secondary connections to the current transformers at station 13. Likewise the invention may be used simply as a power telemetering system for a single feeder.

It will be evident that no current flows in the series summation circuit between stations but that these connections merely serve to add or subtract the voltages across the short-circuited secondaries of the current transformers. The length or resistance of this series circuit is therefore immaterial, and changes in its resistance, such as might be caused by temperature changes or the addition of other stations, will not affect the operation accuracy of the system.

While I have represented an indicating instrument at 19 and 19' this could be replaced or supplemented with a relay, alarm, or any other device commonly employed in connection with metering equipment. In high voltage systems it may be desirable to insert a step-down transformer between the high tension line and the vacuum tube. Other ways of producing the measurement voltages at the power stations will occur to those skilled in the art.

In accordance with the provisions of the patent statutes, I have described the principle of operation of my invention, together with the apparatus which I now consider to represent the best embodiment thereof, but I desire to have it understood that the apparatus shown and described is only illustrative and that the invention may be carried out by other means.

What I claim as new and desire to secure by Letters Patent of the United States is:

1. Apparatus for obtaining a current proportional to the power flowing in an electric circuit comprising an electron discharge device having filament, grid and plate electrodes, connections for impressing a voltage between the filament and plate of said device which is proportional to the voltage of the circuit, and connections for producing a voltage between the filament and grid of said device which is proportional to the current flowing in the circuit.

2. Apparatus for obtaining a measurement of the power flowing in an electric circuit comprising an electron discharge device having filament, grid and plate electrodes, connections for impressing a voltage proportional to the circuit voltage between the filament and plate of said device, current measuring means connected in series with said electron discharge device, and connections for impressing a voltage between the filament and grid of said device proportional to the current of the circuit.

3. Apparatus for obtaining a current proportional to the power flowing in an alternating current circuit comprising an electron discharge device having filament, grid and plate electrodes, connections for impressing a voltage between the filament and plate of said device which is proportional to the circuit voltage, means for producing a voltage proportional to the current of the circuit, and connections for impressing said last mentioned voltage between the filament and grid of said device, the circuit connections being such that the voltages impressed upon the grid and plate of the electron discharge device are in phase when the power factor of the alternating current circuit is unity.

4. Apparatus for obtaining a current proportional to the power flowing in an alternating current circuit comprising an electron discharge device having filament, grid and plate electrodes, connections for impressing a voltage between the filament and plate of said device which is proportional to the circuit voltage, a current transformer connected in the circuit, an impedance connected across the secondary of said transformer, and connections for impressing the voltage across the secondary of said transformer between the filament and grid of said electron discharge device.

5. Power measuring apparatus for alternating current circuits comprising an electron discharge device having filament, grid and plate electrodes, connections for impressing a voltage between the filament and plate of said device which is proportional to the circuit voltage, a current transformer connected in the circuit, an impedance connected across the secondary of said transformer, connections for impressing the voltage across the secondary of said transformer between the filament and grid of said device, and current measuring means in the plate circuit of said device calibrated with the apparatus to give a power measurement of said circuit.

6. In an electron discharge device measuring system, an electron discharge device having filament, grid and plate electrodes, and means for impressing a voltage between the filament and grid of said device which is proportional to the current in an alternating current circuit comprising a current transformer connected in said circuit, an impedance short circuiting the secondary terminals of said transformer, and connections between said terminals and the filament and grid of said device.

7. A power measuring system for alternating current circuits comprising an electron discharge device having filament, grid and plate electrodes, connections, including a current measuring instrument, for impressing a voltage proportional to the circuit voltage between the filament and plate of said device, a plurality of current transformers connected in different branches of the circuit, impedances connected across the secondary terminals of said transformers and connections for connecting the secondary terminals of said transformers in series and impressing the resultant voltage across the filament and grid of said device.

8. A power summation system for electric power circuits comprising an electron discharge device having filament grid and plate electrodes, circuits for impressing a voltage across the filament and plate of said device which is proportional to the voltage of said power circuits, means for producing voltages proportional to the currents flowing in said power circuits, connections for impressing the sum of said voltages across the filament and grid of said device and current measuring means in the plate circuit of said device calibrated with the apparatus to give a summation power measurement.

9. Summation measuring apparatus comprising a plurality of electron discharge device measuring systems, each such system producing an electron discharge current proportional to the quantity measured thereby, current measuring means having a number of windings equal in number to the measuring systems, said windings being arranged to produce accumulative measuring effects, and circuit connections for conveying the electron discharge currents of said systems through said coils.

In witness whereof, I have hereunto set my hand this 15th day of February, 1927.

BENJAMIN W. JONES.